(12) United States Patent
Chazot et al.

(10) Patent No.: US 9,706,015 B2
(45) Date of Patent: Jul. 11, 2017

(54) MULTI-OPERATING SYSTEM INPUT DEVICE

(71) Applicant: Logitech Europe S.A., Lausanne (CH)

(72) Inventors: Philippe Chazot, Saint-Jorioz (FR); Patrick Salamin, Sion (CH); Jiri Holzbecher, Binningen (CH); Remy Zimmermann, Morges (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 14/923,380

(22) Filed: Oct. 26, 2015

(65) Prior Publication Data

US 2016/0127516 A1 May 5, 2016

Related U.S. Application Data

(60) Provisional application No. 62/072,245, filed on Oct. 29, 2014.

(51) Int. Cl.
*H04L 29/06* (2006.01)
*H04W 4/00* (2009.01)

(52) U.S. Cl.
CPC ............ *H04L 69/18* (2013.01); *H04W 4/008* (2013.01)

(58) Field of Classification Search
CPC ... G06F 13/385; G06F 13/387; H04L 129/06; H04L 169/18; H04L 69/18
See application file for complete search history.

(56) References Cited

U.S. PATENT DOCUMENTS

| | | | | |
|---|---|---|---|---|
| 2006/0093365 A1* | 5/2006 | Dybsetter | ............... | H04B 10/40 398/135 |
| 2009/0265722 A1* | 10/2009 | Lu | ........................... | G06F 21/57 719/327 |
| 2011/0113169 A1* | 5/2011 | Maeng | .................... | H04L 12/12 710/106 |
| 2011/0145451 A1* | 6/2011 | Soffer | ..................... | G06F 3/023 710/64 |
| 2014/0075069 A1* | 3/2014 | Mullins | ............... | H04M 1/0274 710/106 |
| 2015/0100991 A1* | 4/2015 | Risberg | ................. | H04L 67/104 725/80 |
| 2016/0014545 A1* | 1/2016 | Tian | ....................... | H04W 8/005 455/41.2 |

* cited by examiner

*Primary Examiner* — Farley Abad
(74) *Attorney, Agent, or Firm* — Kilpatrick Townsend & Stockton LLP (57) ABSTRACT

Embodiments of the present invention provide a method of establishing a wireless connection between a data input device and a host computing device. More specifically, the embodiments of the present invention relate to methods and systems for using a single input device (e.g., keyboard, mouse, or touchpad devices) with multiple host computing devices that may be running different operating systems, and efficiently switching the data protocols used to transmit HID data between the input device and the multiple host computing devices without requiring user interaction.

20 Claims, 4 Drawing Sheets

MULTI-OPERATING SYSTEM INPUT DEVICE

CROSS REFERENCES TO RELATED APPLICATIONS

This application claims the benefit of priority of U.S. Provisional Patent Application No. 62/072,245, filed on Oct. 29, 2014, which is herein incorporated by reference in its entirety for all purposes.

BACKGROUND

Physical input devices (e.g., keyboard, mouse, stylus) are commonly used by users to perform actions (e.g., keystrokes, mouse movements). These actions may then be translated into data that can be provided to a computing device to represent human interactions with the computing device. Today, it is common for a user to have a multitude of computing devices that they use on a regular basis, and even simultaneously. A single user may have a desktop computer, a laptop computer, a mobile device (e.g., mobile phone, smart phone, smartwatch), and a tablet computer. For example, a user may be using a laptop computer for business purposes and a tablet computer for entertainment purposes.

It would be cumbersome and provide a negative user experience for a user to have to carry separate input devices for each computing device and physically move from a first input device connected to a first computing device to a second input device connected to a second computing device in order to operate both computing devices. Some alternatives allow reusing a single input device for data entry to multiple computing devices. However, these solutions are not without their drawbacks.

One significant problem is that some operating systems may not allow an input device to interface and provide human interface device (HID) data reports to the computing device. For example, each computing device may also be running a different operating system (OS) (e.g., Microsoft Windows®, Apple iOS™, Apple Mac OS X®, Android™, Linux®, Chrome OS™). As a result, users with a variety of computing devices may often regularly interface with different operating systems. While a standard input device (e.g., a mouse) using standard HID data reports may work with a computing device running Microsoft Windows® or Apple Mac OS X®, the same input device may not work with Apple iOS™ because standard HID data reports cannot be inputted into an iPhone or iPad device, as devices running Apple iOS™ will only accept non-standard proprietary HID data reports.

Based on the foregoing, there is a need in the art for improved methods and systems to be able to use a single data input device with multiple computing devices running different operating systems.

BRIEF SUMMARY

The present disclosure relates generally to input devices, such as human interface devices (HID), configured for use with electronics or computing devices. More specifically, the present disclosure relates to methods and systems for using a single input device (e.g., keyboard, mouse, or touchpad devices) with multiple host computing devices that may be running different operating systems, and efficiently switching the data protocols used to transmit HID data between the input device and the multiple host computing devices without requiring user interaction. In some embodiments, the input device may also be referred to as a data input device as described below.

Embodiments of the present invention enable an input device that supports a standard HID data protocol to communicate with an application on a host computing device that does not support the standard HID data protocol using a framework associated with the application. In some embodiments, the input device (e.g., a mouse input device) pairs with the host computing device using a standard device discovery process and connection protocol. When the input device is connected to the host computing device, the input device may then automatically switch from a standard HID protocol to a proprietary HID protocol compatible with an operating system and applications stored and/or running on the host computing device.

In some embodiments, an application compatible with the proprietary HID protocol may search for the connected input device, and send the input device a message to use the proprietary protocol. In some embodiments, the input device can support both a standard HID protocol and the proprietary HID protocol, allowing it to work with different types of computing devices operating different operating systems.

In some embodiments, the application includes a module or framework for communicating with the data input device and interpreting the data sent over the proprietary protocol. The module/framework may be imbedded in the application, or can be an add-on module. In one example, the same mouse input device commands that would be sent over a standard HID protocol may be sent instead as data over the proprietary HID data protocol, which is simply passed by the operating system of the host computing device to the application. In such an example, the framework/module can generate a cursor to be displayed, and then use the mouse commands to move the cursor and implement the mouse button clicks, scroll wheel and other mouse input device controls. A similar procedure can be followed for a keyboard device, stylus, remote control, or any other data input device. In such embodiments, the applications may be compatible with the proprietary HID protocol via drivers and library components associated with the applications stored in the framework and used to translate the proprietary HID protocol.

One embodiment of the present invention is directed to a method of establishing a wireless connection between a data input device and a host computing device. The method comprises initiating a pairing process with the host computing device through a data communications connection. The method further comprises receiving one or more requests for notifications indicating characteristics for proprietary services offered by the data input device from the host computing device. The method further comprises automatically switching from a first communications protocol to a second communications protocol based on the one or more requests, and sending data from the data input device to the host computing device using the second communications protocol.

In some embodiments, the host computing device is a second host computing device, the pairing process is a first pairing process, the data communications connection is a first data communications connection, and the data from the data input device is first data. In such embodiments, the method further comprises initiating a second pairing process with a first host computing device through a second data communications connection. The method further comprises receiving one or more requests for notifications indicating characteristics for proprietary services offered by the data input device from the first host computing device. The method further comprises automatically switching from the second communications protocol to the first communications protocol based on the one or more requests, and sending second data from the data input device to the first host computing device using the first communications protocol.

In some embodiments, initiating the pairing process with the host computing device through the data communications connection further comprises sending, by the data input device, a list of available proprietary services offered by the data input device to the host computing device.

In some embodiments, the data from the data input device to the host computing device includes notifications indicating characteristic for services performed by the data input device.

In some embodiments, the second communications protocol is compatible with an operating system running on the host computing device. In some embodiments, the host computing device is a second host computing device, and the first communications protocol is not compatible with an operating system running on the second host computing device In some embodiments, during the pairing process, the data input device advertises the first communications protocol and the second communications protocol In some embodiments, the first communications protocol is a standard human interface device data protocol, and wherein the second communications protocol is a proprietary human interface device data protocol.

In some embodiments, the data input device advertises a unique identifier recognized by a software component stored on the host computing device. In such embodiments, the software component is configured to translate data reports sent by the data input device to the host computing device.

In some embodiments, the data communications connection is a Bluetooth® Smart communications protocol.

In some embodiments, the data input device is one of a keyboard, a mouse, or a touchpad device.

Another embodiment of the present invention is directed to a system. In such an embodiments, the system comprises a first host computing device, the first host computing device running a first operating system, and a data input device. In some embodiments, the data input device is connected to the host computing device using a method comprising initiating a pairing process with the data input device through a data communications connection, receiving, from the first host computing device, one or more requests for notifications indicating characteristics for proprietary services offered by the data input device. The method may also comprise automatically switching from a first communications protocol to a second communications protocol based on the one or more requests, and sending data to the first host computing device using the second communications protocol.

In some embodiments, the system may further comprise a second host computing device, the second host computing device running a second operating system using the first communications protocol.

Another embodiment of the present invention is directed to an input device comprising a transmitter for communicating with a host computing device and computer readable code stored on a non-transitory computer readable media. In some embodiments, the computer readable code stored on the non-transitory computer readable media may include a first set of instructions supporting a standard HID protocol, and a second set of instructions supporting a proprietary HID protocol. In some embodiments, computer readable code stored on the non-transitory computer readable media may also include instructions for switching between the first set of instructions and the second set of instructions upon receiving a notification that the host computing device accepts the proprietary HID protocol.

Another embodiment of the present invention is directed to a framework comprising computer readable code stored on a non-transitory computer readable media, accessible by an application on a host computing device. In some embodiments, the framework may include instructions for discovering an input device connected to the host computing device, instructions for notifying the input device to switch from a standard HID protocol to a proprietary protocol, and instructions for processing HID data reports from the input device in the proprietary HID protocol.

In some embodiments, the framework further comprises instructions for translating HID data received in the proprietary HID protocol, and providing the translated HID data to an application operating on the host computing device.

In some embodiments, the framework further comprises instructions for receiving a device identifier from the input device. The framework may further comprise instructions for determining that the received device identifier matches one of a plurality of device identifiers associated with the framework.

These and other embodiments of the invention along with many of its advantages and features are described in more detail in conjunction with the text below and attached figures.

DETAILED DESCRIPTION

Embodiments of the invention are generally directed to systems and methods for operating a universal wireless input device configured to connect and function with different computing devices running different operating systems. In such embodiments, the different operating systems may use different HID data reports (e.g., standard data reports, proprietary HID data reports) that may be advertised by the wireless input device. Examples of host computing devices include, but are not limited to, a mobile device, tablet computer, desktop computer, laptop computer, server, set-top box, smart TV, smart appliance, remote control hub, or any other device with processing circuitry.

Embodiments are described with respect to a multi-modal wireless input device in the form of a mouse. However, embodiments of the invention are not limited to input devices in the form of a mouse. Other embodiments contemplate input devices in other forms, including, but not limited to: a keyboard, a touchpad, a stylus, a gamepad, a steering wheel, a presentation pointer, a trackball, a joystick, a headset, and a remote control. In addition, the input device may be a data input that does not provide input other than connection data and configuration data (e.g., speakers, display monitors).

I. Exemplary Systems

Figure 1:
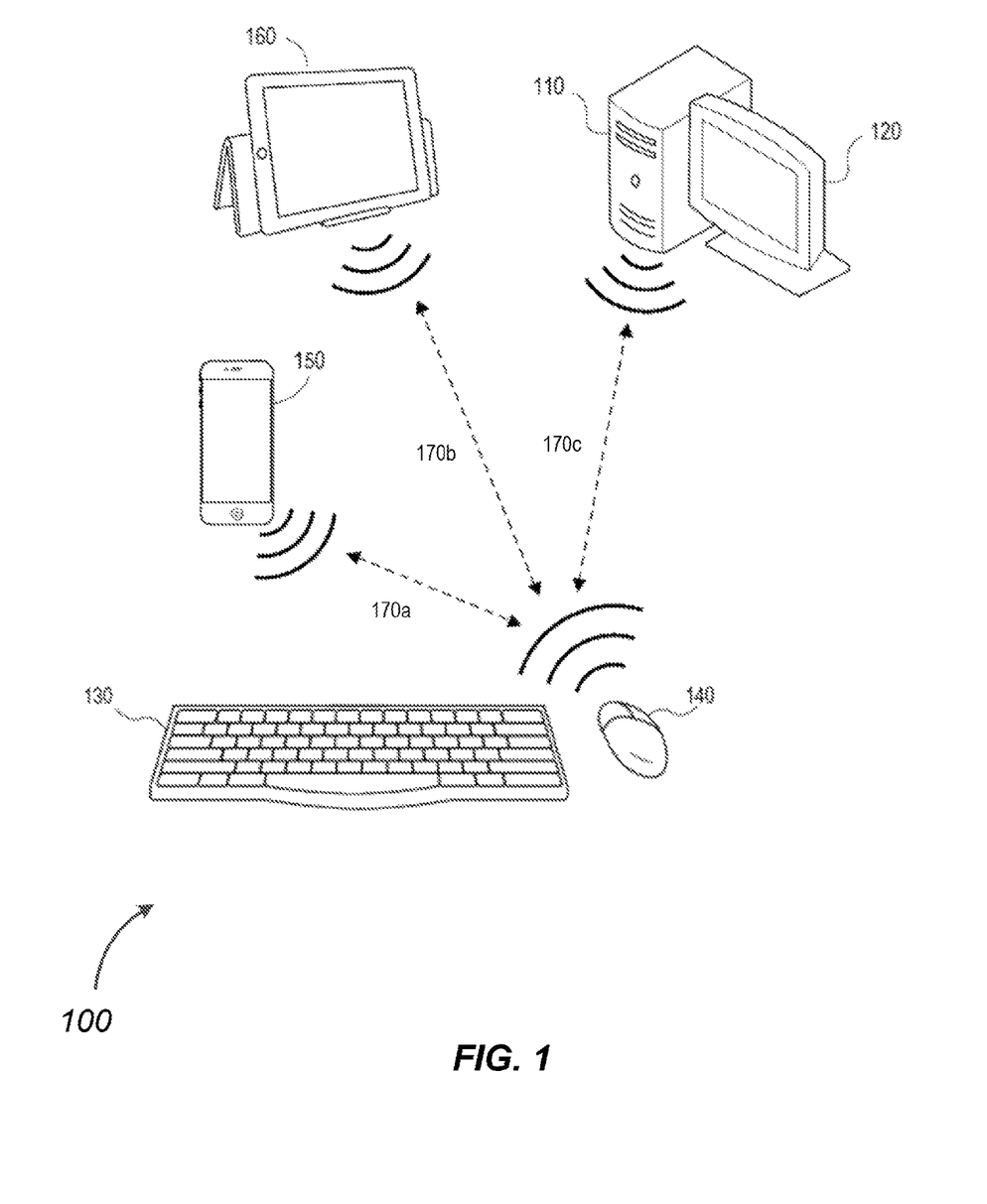
FIG. 1 is a diagram of a system including a plurality of host computing devices and data input devices according to an embodiment of the present invention.

FIG. 1 is a diagram of a system 100 including a plurality of host computing devices and data input devices according to an embodiment of the present invention. In the embodiments depicted in FIG. 1, the system 100 includes a computer 110, a monitor 120 coupled to the computer 100, a keyboard device 130, and a mouse input device 140. In some embodiments, the mouse input device 140 may be a multi-modal mouse. In some embodiments, input device may refer to either or both the keyboard device 130 and the mouse input device 140. In some embodiments, the input devices may also be referred to as a data input device. As noted above, the input device is not limited to a mouse and keyboard, and may include other data input devices. For the system 100, the keyboard device 130 and the mouse input device 140 may be configured to control various aspects of the computer 110 and the monitor 120. The computer 110 may include a non-transitory computer-readable storage medium (not shown) that is configured to store computer code, such as keyboard driver software, mouse driver software, and the like, where the computer code is executable by a processor (not shown) of the computer 110 to affect control of the computer 110 by the mouse input device 140 and keyboard device 130. In some embodiments, the keyboard device 130 and the mouse input device 140 may be hardwired or wirelessly coupled to the computer 110. In other embodiments, the keyboard device 130 and the mouse input device 140 may be hardwired or wirelessly connected to the computer 110 via a hub device or a gateway device (e.g. a router).

In addition to providing data input to the computer 110, the mouse input device 140 can be utilized in any number of configurations and systems (e.g., personal computers, servers, terminals, etc.) as would be appreciated by one of ordinary skill in the art. For example, the mouse input device 140 may wirelessly connect to and provide input to a mobile device 150 (e.g., mobile phone) and/or a tablet computer 160. The computer 110, mobile device 150 and tablet computer 160 may be referred to collectively or individually as host computing devices.

FIG. 1 illustrates the mouse input device 140 with a first pairing to the mobile device 150 over wireless connection 170a, a second pairing with the tablet computer 160 over wireless connection 170b, and a third pairing with the computer 110 over wireless connections 170c. In some embodiments, the wireless connections 170a-c may use a Bluetooth™ connection. Bluetooth™ is a wireless radio technology standard for exchanging data over short distances between fixed and mobile devices. Other embodiments can include other means for providing short-range contact or contactless communications capability, such as radio-frequency identification (RFID), infra-red, or other data transfer capability that can be used to exchange data between the keyboard device 130 and the host computing device. In other embodiments, communications between the keyboard device 130 and any of the computing devices (120, 150, 160) may be conducted using a communications protocol. For example, the communications protocol may be operating at 2.4 GHz or 5.8 GHz. In some embodiments, the mouse input device 140 may be capable of connecting to a first computing device using a first communications protocol, and connecting a second computing device using a second communications protocol.

II. Exemplary Methods

A. Discovery, Connection & Pairing

Figure 2:
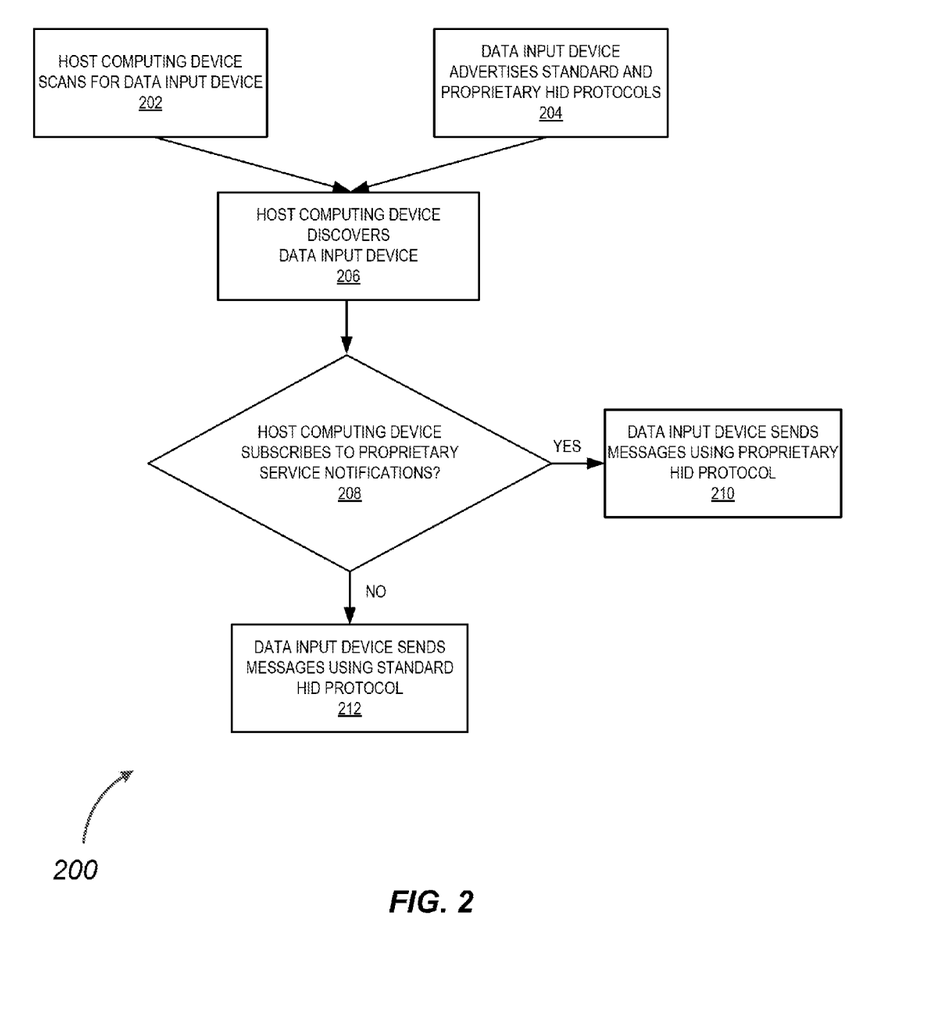
FIG. 2 is a flowchart diagram describing a method for establishing a connection between a data input device and a host computing device and automatically determining the appropriate protocols according to an embodiment of the present invention.

FIG. 2 is a flowchart diagram describing a method for establishing a connection between a mouse input device 140 and a host computing device 110 and automatically determining the appropriate protocols according to an embodiment of the present invention. In the embodiment described with respect to FIG. 2, the data input device is a mouse input device 140.

In step 202, the host computing device 110 scans for the mouse input device 140. The host computing device 110 may scan for the mouse input device 140 when the host computing device 110 is placed in a pairing or discovery mode. The host computing device 110 may be placed in the pairing or discovery mode by a user enabling the pairing or discovery mode. When the host computing device 110 is in discovery mode, other data input devices that are connectable or in discovery mode, can be detected and paired/connected to the host computing device 110. In some embodiments, the host computing device 110 may scan for data inputs or other data input devices that can be paired and/or connected with the host computing device 110.

In some embodiments, the host computing device 110 may be running one of a plurality of operating systems (e.g., Microsoft Windows®, Apple iOS™, Apple Mac OS X®, Android™, Linux®, Chrome OS™). In some embodiments, the host computing device 110 may be configured to run multiple operating system environments, such as in the case of virtual machines.

In step 204, the mouse input device 140 advertises standard HID and proprietary data protocols. In such embodiments, the mouse input device may have been placed in a discovery mode for pairing the mouse input device 140 with the host computing device 110. When the mouse input device 140 is placed in the discovery mode, the mouse input device may begin advertising standard HID and proprietary data protocols. In some embodiments, providing power to the mouse input device 140 may place the mouse input device 140 automatically in the discoverable mode. In other embodiments, the mouse input device 140 is placed in the discovery mode by a user selection or user interaction.

In step 206, the host computing device 110 discovers the mouse input device 140. In some embodiments, when the host computing device 110 discovers the mouse input device, a connection and pairing process may be initiated. In some embodiments, the pairing process may be to establish a wireless connection between the mouse input device 140 and the host computing device 110. In some embodiments, the wireless connection can be Bluetooth®, Bluetooth Smart®, or any other wireless standard or proprietary wireless network protocol.

In some embodiments, the user may have to interact with the host computing device 110 to initiate the connection and pairing process with the mouse input device 140. For example, the user may have to input a code into the host computing device 110 to confirm that the user wants to pair the mouse input device 140 with the host computing device 110. In some embodiments, the user may be required to access settings in the host computing device 110 and select the mouse input device 140 from a list of available or discoverable devices. In other embodiments, the user does not have to interact with the host computing device 110 to initiate the connection with the mouse input device 140, and the connecting and pairing process may be initiated and completed automatically.

B. Standard and Proprietary Protocols Supported and Advertised

In some embodiments, the mouse input device 140 may be programmed to support both standard and proprietary protocols. The software or firmware in the mouse input device 140 may store information needed for both protocols, and may be configured to advertise and transmit data using both protocols.

The mouse input device 140 may advertise both a standard HID data protocol and the proprietary data protocol. The standard HID protocol and the proprietary protocol may be transmitted on separate communications channels. Upon completion of the connection, the mouse input device 140 may send standard HID data reports to the host computing device 110.

In some embodiments, the host computing device 110 may not accept HID data reports (e.g., input data generated based on human interactions with the mouse input device 140) from the mouse input device 140. For example, while a first host computing device running the Microsoft Windows® 10 operating system may accept standard HID data reports from the mouse input device 140, a second host computing device running the Apple iOS™ operating system may not. In such situations, while the mouse input device 140 may be successfully paired with the second host computing device running the Apple iOS™ operating system (through the pairing process described above), the Apple iOS™ operating system may block or ignore any data reports sent from the mouse input device 140 to the second host computing device using standard HID data reports. In such situations, the mouse input device 140 may be configured to send proprietary HID data reports to the host computing device 110 that will be recognized by the second host computing device.

C. Switching to Proprietary Protocol

In step 208, the mouse input device 140 determines whether the host computing device 110 subscribes to proprietary service notifications (e.g., a proprietary protocol is required for sending inputs to the host computing device 110). In one embodiment, this determination is made via a notification message or other type of indication sent from an application running on the host computing device 110.

In some embodiments, when the mouse input device 140 is connected or paired with the host computing device 110, an application stored on the host computing device may be launched. In other embodiments, the application stored on the host computing device 110 may be actively running prior to the connection or pairing process. The application stored on the host computing device 110 may send a message to the mouse input device 140 requesting that the mouse stop using standard HID data reports, and instead send proprietary protocol HID data reports to the host computing device 110.

In step 210, when the mouse input device 140 determines that the host computing device 110 does subscribe to proprietary service notifications or a proprietary protocol is required for sending inputs to the host computing device 110, the mouse input device 140 may automatically switch sending data reports from the standard HID protocol to the proprietary protocol. A module or framework for interpreting the proprietary HID data reports will have been previously loaded into the drivers or libraries associated with one or more applications or software programs running on the host computing device 110, so that the proprietary HID data reports can be understood by the application stored on the host computing device 110.

In step 212, when the mouse input device 140 determines that the host computing device 110 does not subscribe to proprietary service notifications or require the use of proprietary HID data reports, the mouse input device 140 may send standard HID data reports. In such embodiments, the mouse input device 140 may not switch from the standard HID data protocol advertised during the pairing process.

Subsequently, when the mouse input device 140 is switched from the host computing device 110 to a tablet computer 160 (or to another host computing device), the process described above will be repeated between the mouse input device 140 and the tablet computer 160.

It should be appreciated that the specific steps illustrated in FIG. 2 provide a particular method 200 according to an embodiment of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or removed depending on the particular applications. One of ordinary skill in the art would recognize many variations, modifications, and alternatives.

D. Host Application with Framework

Figure 3:
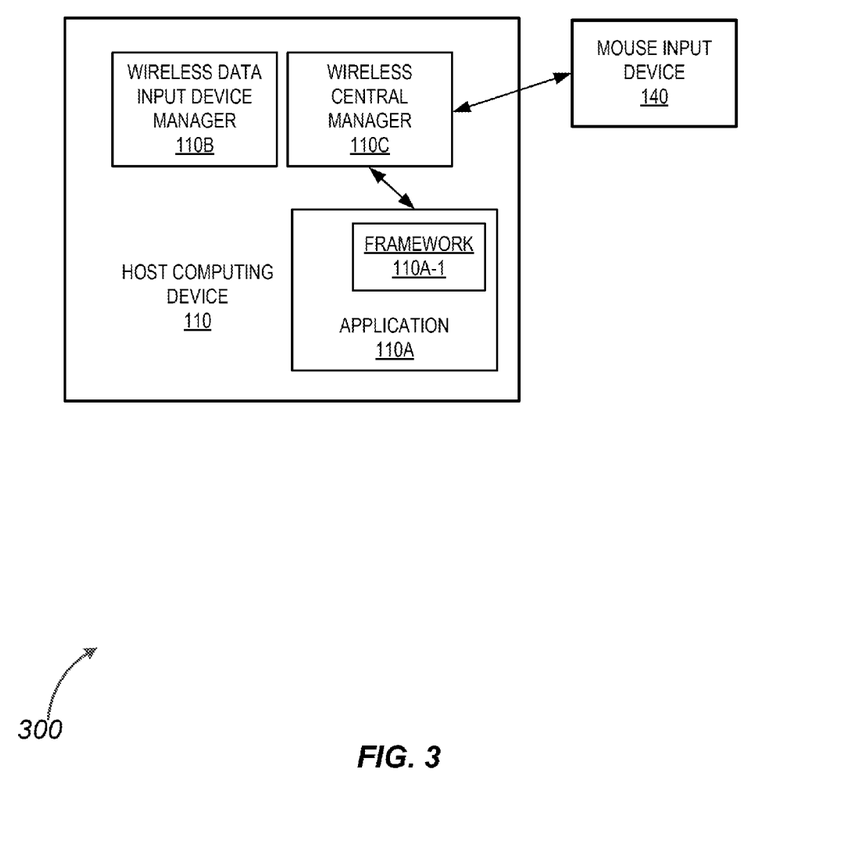
FIG. 3 is a diagram showing the interaction between a host computing device and an input device according to an embodiment of the present invention.

FIG. 3 is a diagram showing the interaction between a host computing device 110 and a mouse input device 140 according to an embodiment of the present invention.

As depicted in FIG. 3, the host computing device may include an application 110a, a wireless data input device manager 110b (e.g., a Bluetooth™ data input manager), a wireless central manager 110c (e.g., a Bluetooth™ central manager). The application 110a may be stored in a memory portion (not pictured) of the host computing device 110. A framework 110a-1 may be embedded into the application 110a stored on the host computing device 110. In some embodiments, the framework 110a-1 can cause the a processor (not pictured) in the host computing device 110, or another component in the host computing device 110 (e.g., the wireless central manager 110c), to carry out the functionality of the framework 110a-1, as described herein. In some embodiments, the framework 110a-1 may be configured to interface the mouse input device 140 with non-standard HID-compatible operating systems (e.g., Apple iOS™, Android™, Chrome OS™). In some embodiments, the framework 110a-1 may comprise computer readable code stored on a non-transitory computer readable media, accessible by the application 110a stored on the host computing device 110.

The mouse input device 140 may advertise both standard HID protocols (for interactions with Windows®, Linux®, Mac OS X®, etc.) and proprietary protocols (for interactions with Apple iOS™, Android™, Chrome OS™, etc.).

An operating system running on the host computing device 110 may manage the communications that are passed to the host computing device 110 through the wireless central manager 110c from the mouse input device 140. The framework 110a-1 may connect to the wireless central manager 110c of the host computing device 110 to scan, establish connections, and communicate with the mouse input device 140.

In some embodiments, when a non-standard HID-compatible operating system running on the host computing device 110 recognizes that communications from the mouse input device 140 are being sent using a standard HID protocol, the operating system may launch a pop-up window on the display of the host computing device 110. In such embodiments, the pop-up window may include a message to the user allowing the pairing with the mouse input device 140 using the proprietary protocol. In such embodiments, the mouse input device 140 may stop advertising standard HID data reports and begin advertising proprietary HID data reports.

E. Connection Process

Figure 4:
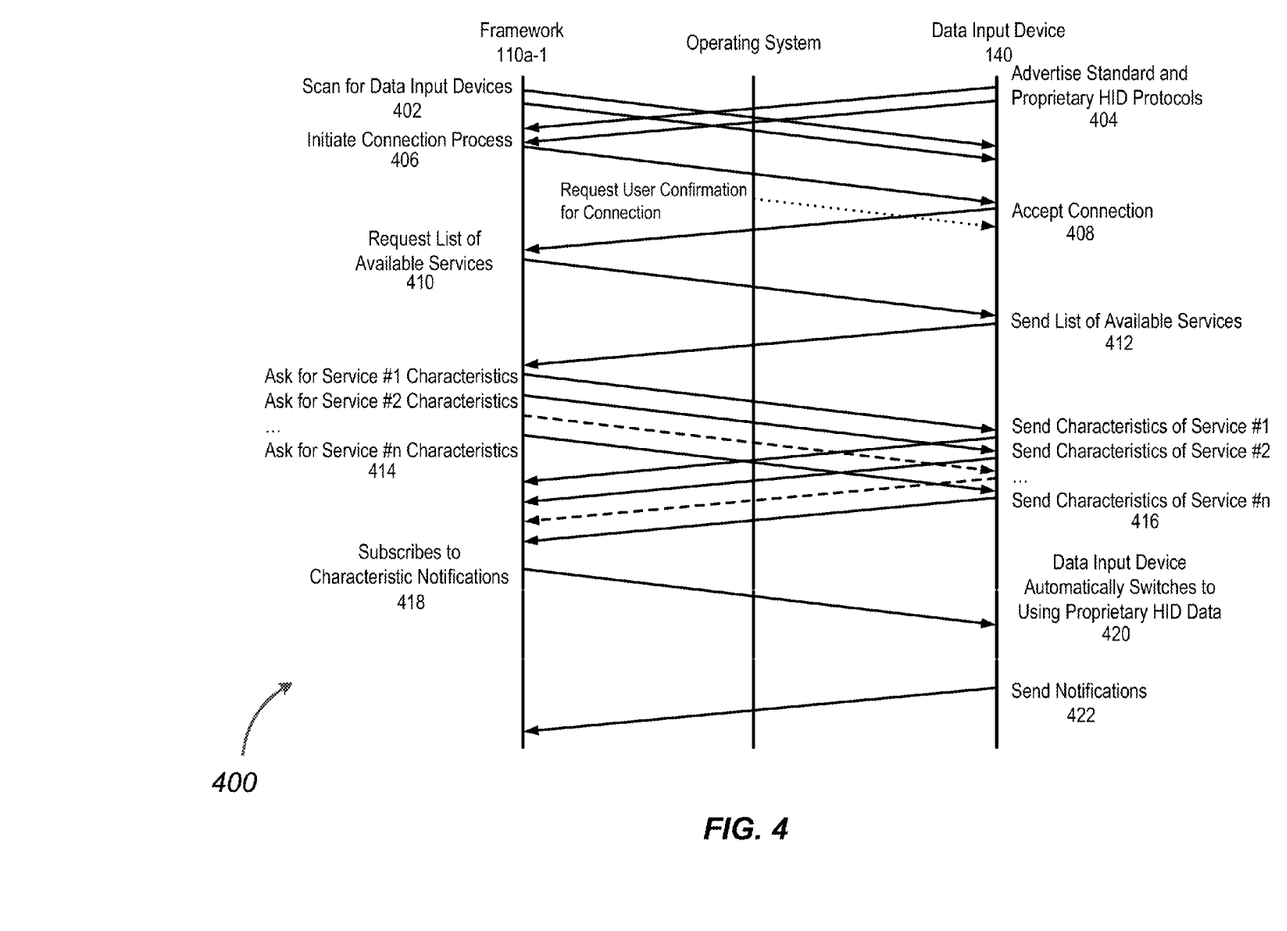
FIG. 4 is a diagram illustrating a method for establishing a connection between a mouse input device and a host computing device and automatically determining the appropriate communications protocol according to an embodiment of the present invention.

FIG. 4 is a diagram illustrating a method for establishing a connection between a mouse input device 140 and a host computing device 110 and automatically determining the appropriate communications protocol according to an embodiment of the present invention. In the embodiment shown in FIG. 4, the host computing device 110 is a host computing device that accepts proprietary HID data reports (e.g., an Apple iOS™ device).

In step 402, a framework 110*a*-1 of an application 110*a* stored in a memory portion on the host computing device 110 may scan for data input devices (e.g., the mouse input device 140) that may be connected or paired with the host computing device 110. The framework 110*a*-1 and the application 110*a* may be associated with the mouse input device 140 and may be configured to scan for designated data input devices (e.g., devices advertising a specific universally unique identifier ("UUID")) that have drivers or a library loaded into the framework. For example, in some embodiments, the application 110*a* may be provided by a manufacturer of the mouse input device 140. In other embodiments, the application 110*a* may be a standard application that is modified to include the framework 110*a*-1.

In some embodiments, the operating system for the host computing device 110 (e.g., Apple iOS™) may be configured to use the framework 110*a*-1 to automatically scan for designated data input devices. The operating system may use the framework 110*a*-1 when the application 110*a* loaded with the framework 110*a*-1 is launched on the host computing device 110. For example, when a photo editing application loaded with a framework provided by Company A is selected on the host computing device 110, the framework may begin scanning or otherwise attempt to locate a data input device having a UUID associated with Company A. The framework 110*a*-1 may store a plurality of UUIDs for which the framework 110*a*-1 has a library and/or drivers stored.

In step 404, the mouse input device 140 may be placed in a discovery mode and may begin advertising both standard HID protocols (to be able to interact with host computing devices using Windows®, Mac OS X®, etc.) and proprietary HID protocols (to be able to interact with host computing devices using Apple iOS™, etc.). The mouse input device 140 may also begin advertising a proprietary UUID associated with the mouse input device 140.

In step 406, the framework 110*a*-1 may discover the mouse input device 140 advertising one of the designated UUIDs and initiate a communication and a connection process with the mouse input device 140. The connection between the mouse input device 140 and the host computing device 110 may be managed by a wireless central manager 110*c* located within the host computing device 110. In some embodiments, the operating system on the host computing device 110*a* may generate and send a request message to have a user confirm the connection.

In step 408, the mouse input device 140 may accept the connection with the host computing device 110 through the wireless central manager 110*c*. In some embodiments, the wireless connection can be Bluetooth®, Bluetooth Smart®, or any other wireless standard or proprietary wireless network protocol. In some embodiments, the user associated with the mouse input device 140 and the host computing device 110 may have to interact with the host computing device 110 to initiate the connection and pairing process with the mouse input device 140. In other embodiments, the user does not have to interact with the host computing device 110 to initiate the connection with the mouse input device 140, and the connecting and pairing process may be initiated and completed automatically.

In step 410, once the pairing connection process between the mouse input device 140 and the host computing device 110 has been completed successfully, the framework 110*a*-1 associated with the application 110*a* stored on the host computing device 110 may request a list of available services offered by the mouse input device 140. For example, the list of available services can include, but is not limited to, cursor movements, button/key clicks, scroll wheel movements, and keystrokes.

In step 412, the mouse input device 140 may send the list of available services offered by the mouse input device 140 back to the framework 110*a*-1 associated with the application 110*a* stored on the host computing device 110.

In step 414, the framework 110*a*-1 associated with the application 110*a* may send messages to the mouse input device 140 requesting information regarding the characteristics of one or more of the available services offered by the mouse input device 140.

In step 416, the mouse input device 140 may send the characteristics of the one or more of the available services offered by the mouse input device 140 that were requested by the framework 110*a*-1 associated with the application 110*a*. The characteristics may include information regarding the type of information or notifications that may be sent from the mouse input device 140, and the communications channel that will be used to transmit information between the mouse input device 140 and the computing device. For example, for the mouse input device 140, notifications may include information on the movements of the mouse input device 140 along the x-axis and along the y-axis.

In step 418, the framework 110*a*-1 associated with the application 110*a* may send an indication to the mouse input device 140 indicating the host computing device 110 would like to subscribe to notifications indicating characteristics (e.g., GATT notifications) associated with a service offered by the mouse input device 140. The framework 110*a*-1 may also send an indication to the mouse input device 140 for HID data reports to be sent back to the framework using the proprietary HID protocols.

In step 420, the mouse input device 140 may receive the indications from the framework 110*a*-1 indicating the selection of notifications indicating characteristics to which the framework has requested to subscribe to, as well as the type of HID data reports to send (either standard HID or proprietary HID). When the framework 110*a*-1 requests proprietary HID data reports, the mouse input device 140 may automatically stop advertising standard HID data reports and only advertise proprietary HID data reports. In other embodiments, where standard HID data reports are accepted by the host computing device, the mouse input device 140 may automatically stop advertising proprietary HID data reports. In some embodiments, the mouse input device 140 may advertise both standard HID data reports and proprietary HID data reports. The protocol switching performed by the mouse input device 140 may be performed without requiring any user interaction to effect the protocol switching from the standard HID protocol to the proprietary HID protocol (or vice versa).

In step 422, the mouse input device 140 may send proprietary HID data reports to the framework 110*a*-1 via the wireless central manager 110*c* of the host computing device 110. The framework 110*a*-1 may be configured to translate the proprietary HID data reports for the application 110*a*.

Subsequently, when the application 110*a* on the host terminates a subscription to the proprietary HID data reports (e.g., application 110*a* on the host computing device 110 is uninstalled or closed), the mouse input device 140 may switch back to the use of the standard HID data protocol.

In some embodiments, the mouse input device 140 may advertise an identifier (or UUID) for a generic or compound class of data input devices, as opposed to a specific identifier unique to the mouse input device 140 that might be rejected as an unsupported device by some operating systems.

In some embodiments, upon being launched, the framework 110*a*-1 in an application 110*a* may query the operating system libraries through an application programming interface (API) to determine if certain data input devices (e.g., a mouse input device 140) have been connected. This may occur if the application 110*a* is launched after a pairing and connection process between the host computing device 110 and the mouse input device 140 was previously established prior to the launching the application 110*a*. When the framework 110*a*-1 determines that there has been a connection, the framework 110*a*-1 may send a message to the mouse input device 140, using the OS library, indicating to the mouse input device 140 to begin advertising notifications using the proprietary HID protocol. The framework 110*a*-1 may also automatically try to connect to any device not already paired or connected.

In some embodiments, to simplify the programming of the mouse input device 140, data placed in the proprietary HID protocol fields may be in a same format as data for a standard HID protocol. In alternate embodiments, a different format could be used for the proprietary HID protocol.

It should be appreciated that the specific steps illustrated in FIG. 4 provide a particular method 400 according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Embodiments of the present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teaching provided herein, a person of ordinary skill in the art will appreciate other ways and/or methods to implement embodiments of the present invention.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

In embodiments, any of the entities described herein may be embodied by a computer that performs any or all of the functions and steps disclosed.

It should be noted that any recitation of "a", "an" or "the" is intended to mean "one or more" unless specifically indicated to the contrary.

It is also understood that the examples and embodiments described herein are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

What is claimed is:

1. A method comprising:
   advertising, by an input device, an availability for establishing a wireless communication with a host computer device, the advertising broadcasted in both a standard human interface device (HID) protocol and a proprietary HID protocol;
   receiving a request from the host computing device to initiate a wireless connection;
   accepting and establishing the wireless connection by the input device;
   receiving, by the input device from the host computing device, an indication of a type of HID data report to send;
   switching to the proprietary HID protocol with the host computing device when the indication of the type of HID data report corresponds to the propriety HID protocol; and
   switching to the standard HID protocol with the host computing device when the indication of the type of HID data report corresponds to the standard HID protocol.

2. The method of claim 1 further comprising:
   discontinuing communication with the host computing device using the standard HID protocol when the type of HID data report corresponds to the propriety HID protocol; and
   discontinuing communication with the host computing device using the proprietary HID protocol when the type of HID data report corresponds to the standard HID protocol.

3. The method of claim 1 wherein the host computing device is a first host computing device, wherein the wireless connection is a first wireless connection, and wherein the method further comprises:
   receiving a request, from a second host computing device, to initiate a second wireless connection with the input device;
   accepting and establishing the second wireless connection with the second host computing device on a separate communication channel than the wireless connection with the first host computing device;

receiving, by the input device from the second host computing device, an indication of a type of HID data report to send;

switching to the proprietary HID protocol with the second host computing device when the indication of the type of HID data report corresponds to the propriety HID protocol; and switching to the standard HID protocol with the second host computing device when the indication of the type of HID data report corresponds to the standard HID protocol.

4. The method of claim 3 wherein the first wireless connection with the first host computing device is compatible with a first type of operating system, and wherein the second wireless connection with the second host computing device is compatible with a second type of operating system.

5. The method of claim 1 further comprising:
sending, by the input device, a list of available services provided by the input device to the host computing device.

6. The method of claim 5 further comprising:
receiving a request for characteristics of one or more of the available services; and
sending the characteristics of the available services to the host computing device.

7. The method of claim 1 wherein the input device advertises a unique identifier recognized by a software component stored on the host computing device.

8. The method of claim 1 wherein the data input device is one of a keyboard, a mouse, or a touchpad device.

9. A computer-implemented system on an input device, the system comprising:
one or more processors; and
one or more non-transitory computer-readable storage mediums containing instructions configured to cause the one or more processors to perform operations including:
advertising, by an input device, an availability for establishing a wireless communication with a host computer device, the advertising broadcasted in both a standard human interface device (HID) protocol and a proprietary HID protocol;
receiving a request from the host computing device to initiate a wireless connection;
accepting and establishing the wireless connection by the input device;
receiving, by the input device from the host computing device, an indication of a type of HID data report to send;
switching to the proprietary HID protocol with the host computing device when the indication of the type of HID data report corresponds to the propriety HID protocol; and
switching to the standard HID protocol with the host computing device when the indication of the type of HID data report corresponds to the standard HID protocol.

10. The system of claim 9 wherein the one or more non-transitory computer-readable storage mediums further contain instructions configured to cause the one or more processors to perform operations including:
discontinuing communication with the host computing device using the standard HID protocol when the type of HID data report corresponds to the propriety HID protocol; and discontinuing communication with the host computing device using the proprietary HID protocol when the type of HID data report corresponds to the standard HID protocol.

11. The method of claim 9 wherein the host computing device is a first host computing device, wherein the wireless connection is a first wireless connection, and wherein the one or more non-transitory computer-readable storage mediums further contain instructions configured to cause the one or more processors to perform operations including:
receiving a request, from a second host computing device, to initiate a second wireless connection with the input device;
accepting and establishing the second wireless connection with the second host computing device on a separate communication channel than the wireless connection with the first host computing device;
receiving, by the input device from the second host computing device, an indication of a type of HID data report to send;
switching to the proprietary HID protocol with the second host computing device when the indication of the type of HID data report corresponds to the propriety HID protocol; and
switching to the standard HID protocol with the second host computing device when the indication of the type of HID data report corresponds to the standard HID protocol.

12. The system of claim 11 wherein the first wireless connection with the first host computing device is compatible with a first type of operating system, and wherein the second wireless connection with the second host computing device is compatible with a second type of operating system.

13. The system of claim 9 wherein the one or more non-transitory computer-readable storage mediums further contain instructions configured to cause the one or more processors to perform operations including:
sending, by the input device, a list of available services provided by the input device to the host computing device.

14. The system of claim 13 wherein the one or more non-transitory computer-readable storage mediums further contain instructions configured to cause the one or more processors to perform operations including:
receiving a request for characteristics of one or more of the available services; and
sending the characteristics of the available services to the host computing device.

15. The system of claim 9 wherein the input device advertises a unique identifier recognized by a software component stored on the host computing device.

16. A method comprising:
receiving, by a host computing device from an input device, a request to establish wireless communicative connection, the request provided in both standard and proprietary HID communication protocols;
initiating a connection process to establish the wireless communicative connection with the input device;
requesting, by the host computing device, a list of available services offered by the input device;
receiving, by the host computing device, the list of available services offered by the input device;
requesting, by the host computing device, a list of available service characteristics for one or more of the available services;

receiving, by the host computing device, the list of available service characteristics for the one or more of the available services;

determining, by the host computing device, which of the HID communication protocols to select based on the available service characteristics; and interfacing with the input device via the determined HID communication protocol.

17. The method of claim 16 wherein the input device is a computer mouse.

18. The method of claim 16 wherein the list of available services includes at least one of cursor movement control, a button press, scroll wheel operation, touch sensor operation, and keystrokes.

19. The method of claim 18 wherein the available service characteristics include information regarding the type of information or notifications to be sent from the input device.

20. The method of claim 16 further including sending an indication of the determined HID communication protocol to the input device.

* * * * *